(12) United States Patent
Chen

(10) Patent No.: US 10,960,302 B2
(45) Date of Patent: Mar. 30, 2021

(54) HEAD MOUNTED DISPLAY DEVICE FOR VR SELF-SERVICE GAME MACHINE

(71) Applicant: VR LEO USA, INC., Los Angeles, CA (US)

(72) Inventor: Xiuchao Chen, Shanghai (CN)

(73) Assignee: VR LEO USA, INC, Los Angeles, CA (US)

( * ) Notice: Subject to any disclaimer, the term of this patent is extended or adjusted under 35 U.S.C. 154(b) by 0 days.

(21) Appl. No.: 16/792,254

(22) Filed: Feb. 16, 2020

(65) Prior Publication Data

US 2020/0261796 A1 Aug. 20, 2020

(30) Foreign Application Priority Data

Feb. 17, 2019 (CN) .......................... 201920203277.2

(51) Int. Cl.
*A63F 13/25* (2014.01)
*A63F 13/90* (2014.01)
*G06F 3/14* (2006.01)

(52) U.S. Cl.
CPC .............. *A63F 13/25* (2014.09); *A63F 13/90* (2014.09); *G06F 3/14* (2013.01); *A63F 2300/8082* (2013.01)

(58) Field of Classification Search
CPC .. A63F 13/25; A63F 13/90; A63F 2300/8082; G06F 3/14
See application file for complete search history.

(56) References Cited

U.S. PATENT DOCUMENTS

| 2,649,019 | A | * | 8/1953 | Hartline | A42B 3/04 359/409 |
|---|---|---|---|---|---|
| 3,051,047 | A | * | 8/1962 | Fieux | F16M 11/10 359/399 |
| 4,711,411 | A | * | 12/1987 | Copp | B64D 25/00 244/1 R |
| 4,953,963 | A | * | 9/1990 | Miller | A42B 3/042 359/407 |
| 5,815,126 | A | * | 9/1998 | Fan | G02B 27/017 345/7 |
| 9,265,296 | B2 | * | 2/2016 | Dal Monte | A42B 3/08 |
| 10,524,528 | B2 | * | 1/2020 | Dal Monte | A42B 3/0473 |
| 2003/0014212 | A1 | * | 1/2003 | Ralston | H04N 13/194 702/150 |
| 2015/0094142 | A1 | * | 4/2015 | Stafford | G06F 3/017 463/31 |
| 2016/0171704 | A1 | * | 6/2016 | Raghoebardajal | G06K 9/4661 345/633 |
| 2017/0160812 | A1 | * | 6/2017 | Park | G06F 21/00 |
| 2018/0356637 | A1 | * | 12/2018 | Hu | G02B 6/4471 |

(Continued)

*Primary Examiner* — Malina D. Blaise
(74) *Attorney, Agent, or Firm* — M.J. Ram and Associates

(57) ABSTRACT

A head mounted VR viewing device for a VR self-service game machine is described. A supporting frame has a VR display mounted by a two-part buckle to a forward end thereof, the buckle including a spring bolt configured for moveably retaining the VR display in an upward or downward position. Multiple curved and cushioned supporting surfaces mounted to the supporting frame position the viewing device on the head of a user. A data cable, also mounted to the supporting frame, provides high-definition video transmission and power to the from the game machine to the VR display, and also functions to suspend the VR viewing device.

4 Claims, 4 Drawing Sheets

(56) References Cited

U.S. PATENT DOCUMENTS

| | | | | |
|---|---|---|---|---|
| 2019/0146578 A1* | 5/2019 | Ikuta | ................ | G06F 3/04847 |
| | | | | 345/8 |
| 2019/0329136 A1* | 10/2019 | Koyama | ............... | A63F 13/577 |
| 2020/0147418 A1* | 5/2020 | Haciomeroglu | ..... | A62B 18/082 |

* cited by examiner

HEAD MOUNTED DISPLAY DEVICE FOR VR SELF-SERVICE GAME MACHINE

This application claims benefit of Chinese Application No. 201920203277.2 filed Feb. 17, 2019.

The present application relates to a game device, in particular a head mounted display device for a virtual reality (VR) self-service game machine.

BACKGROUND ART

A big screen VR integrated game machine is a type of amusement device that can provide a virtual reality gaming experience. A VR integrated game machine is an amusement device that integrates a head mounted display and a control handle for playing VR games, a computer device for playing VR games, and a VR game and a gaming platform. Users can enjoy VR games through the VR integrated game machine.

A head mounted display device for a VR self-service game machine, a key core component of a large screen VR integrated game machine, provides a complete solution to the need for a VR head mounted display for a VR game machine.

The existing VR integrated game machines have the following disadvantages regarding the aspects of wearing and replacement of the head mounted display. Specifically, the existing integrated game machine head mounted display devices are typically the original head mounted display devices provided by various manufacturers of different brands and can require different wearing methods, and can be difficult to be installed and be compatible with the existing VR game machines. This can further cause difficulties in their maintenance.

SUMMARY

In order to solve the several technical problems, the present description provides a head mounted display device for a VR self-service game machine, which has an overall modular docking design, and can achieve game machine sharing and unattended operation. In addition, the presently described device can be docked with various VR head mounted displays of different brands, which is convenient for maintenance and upgrade.

DETAILED DESCRIPTION

Figure 1:
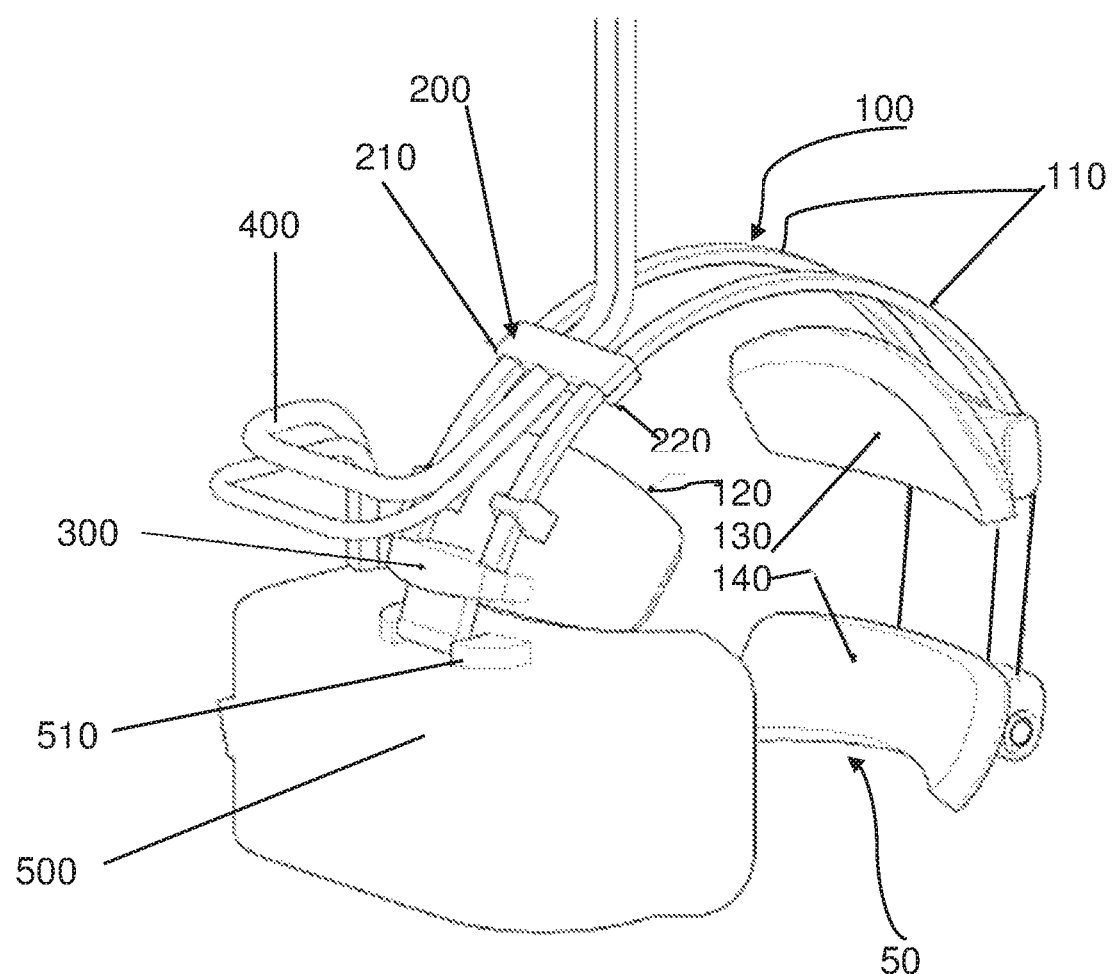
FIG. 1 is a perspective view of a head mounted display device incorporating features of the invention.

The head mounted display device described herein is a key improvement for the manner in which a head mounted display of an existing game machine is worn. It is convenient to wear and can meet the requirements of different users who may have various head shapes.

The technical solutions adopted by the presently described device to solve its technical problems are as follows:

A head mounted display device for a VR self-service game machine comprising a supporting assembly, a wire harness clip, a head mounted display connection buckle, and a data cable assembly.

The VR head mounted display, the wire harness clip, the head mounted display connection buckle, and the data cable are connected together through the supporting assembly. As shown in the Figures, and more fully described below the supporting assembly comprises three supporting curved surfaces connected in series by a supporting frame. The supporting frame comprises two parallel curved steel bars, and the wire harness clip is fixed on the supporting frame.

The supporting curved surface is a supporting structure of three curved surfaces fixed on the supporting frame, and a cushion is attached to an inner side thereof.

The wire harness clip comprises two parts, an upper wire harness clip and a lower wire harness clip. The upper wire harness clip and the lower wire harness clip are each provided with a groove therein, and the supporting frame and the data cable are firmly fixed together by the wire harness clips.

A spring bolt is provided within the head mounted display connection buckle, which is connected with a head mounted display connection point on the VR head mounted display.

The spring bolt is composed of a rotating shaft and with a spring on the shaft. It can provide a two positioned structure so as to allow movement of the head mounted display up and down.

The data cable exits from one side of the VR head mounted display and is fixed to the supporting frame via the wire harness clips. In addition, an extended portion thereof is connected to a host inside a VR integrated game machine. The data cable provides high-definition video transmission and power support for the VR display.

The data cable is used to provide high-definition video transmission and power support for the VR head mounted display and partially supports the weight of the suspended VR head mounted display.

Some of the benefits of the present design are as follows:

The present design shown and described herein allows the head mounted display to be closely attached to a user's head through the supporting frame which provides tension, and the user can turn the VR head mounted display up and down as needed.

The customizing the head mounted display connection buckle allows the supporting assembly of the head mounted display device to more conveniently match the VR head mounted displays of different brands.

The customizing the wire harness clip of the present allows the data cable to be arranged on top of the head mounted display device, thus avoiding the data cable from entanglement during the process in which a user is using the device. In addition, lifting or lowering the VR integrated game machine is made more convenience.

The head mounted display device described herein is convenient to wear and is highly comfortable; the VR head mounted display can be turned up and down by a user as needed without taking off the entire head mounted display device, so that the user can free his hands from moving the head mounted display device.

The head mounted display can be perpendicular to the ground, which has an attractive overall design. It can be connected to the VR head mounted displays of different brands, thus improving the diversity of the head mounted display options available and reducing the cost of later upgrades. As a result, it is suitable for unattended operation of the VR integrated game console equipment, which makes later operation simpler and more efficient. Moreover, it can lower the costs and greatly reduce the equipment loss rate.

An embodiment incorporating features of the invention is further described in detail with reference to the drawings.

Figure 3:
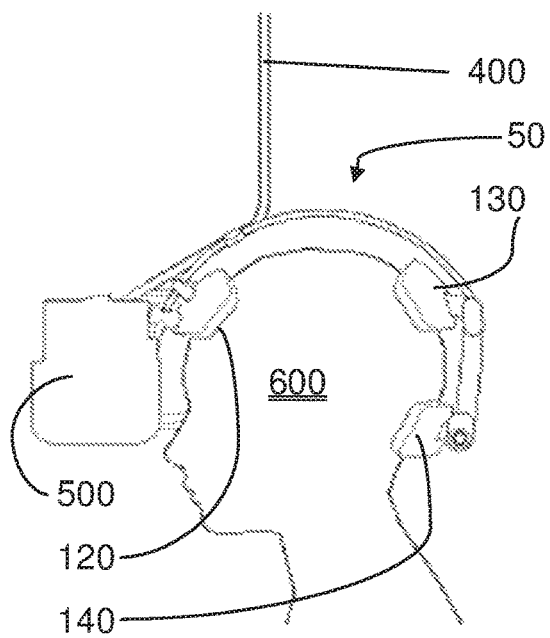
FIG. 3 is a schematic side view of the head mounted display device mounted on the head of a user prior to placement of the viewing mask.
Figure 4:
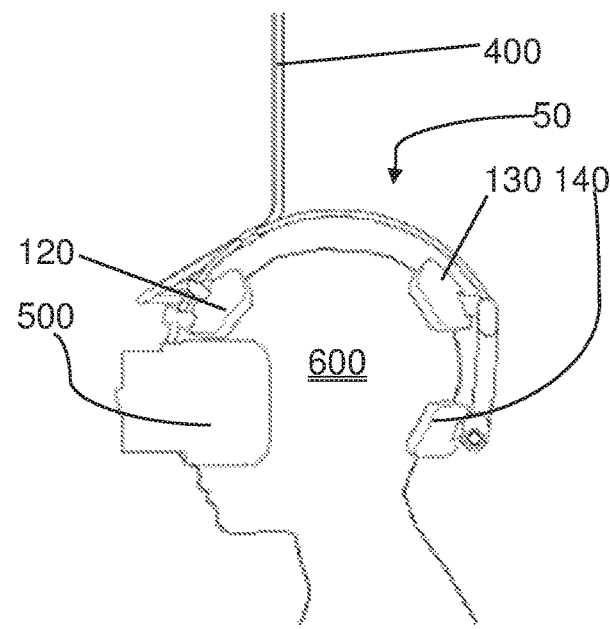
FIG. 4 is a schematic side view of the head mounted display device mounted on the head of a user after placement of the viewing mask.

FIG. 1 shows an embodiment of a head mounted display device 50 incorporating features of the invention where a supporting assembly 100 comprises a two piece supporting frame 110 with a first supporting curved surface 120, a second supporting curved surface 130 and a third supporting curved surface 140 attached to the supporting frame 110. These supporting surfaces 110, 120, and 130 are positioned as shown in FIGS. 3 and 4 to rest on the top and rear of a user's head. A two piece wire harness clip 200 comprising an upper wire harness clip 210 and a lower wire harness clip 220 retains a data cable 400.

Figure 5:
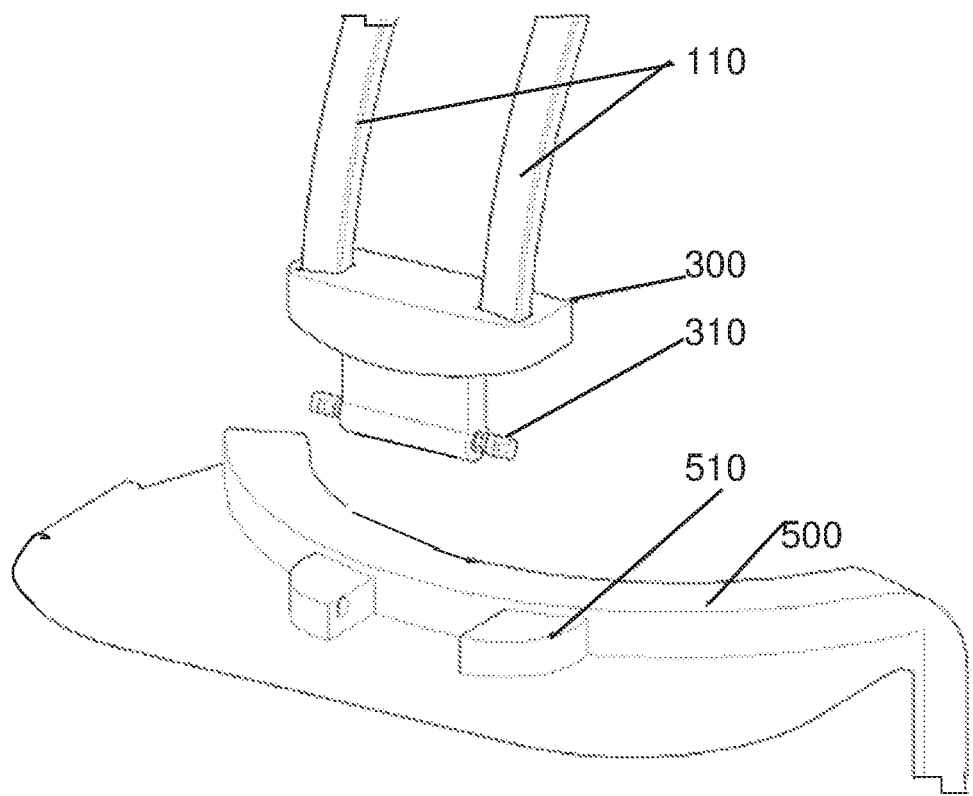
FIG. 5 is an enlarged partial schematic diagram illustrating attachment of the replaceable display portion of the head mounted display of FIG. 1.

Also attached to the supporting frame 110 is a head mounted display connection buckle 300 which includes a spring bolt 310 best shown in FIG. 5. The VR head mounted display 500 is attached to the forward end of the supporting frame 110 through the head mounted display connection point 510 (see FIG. 5).

Figure 2:
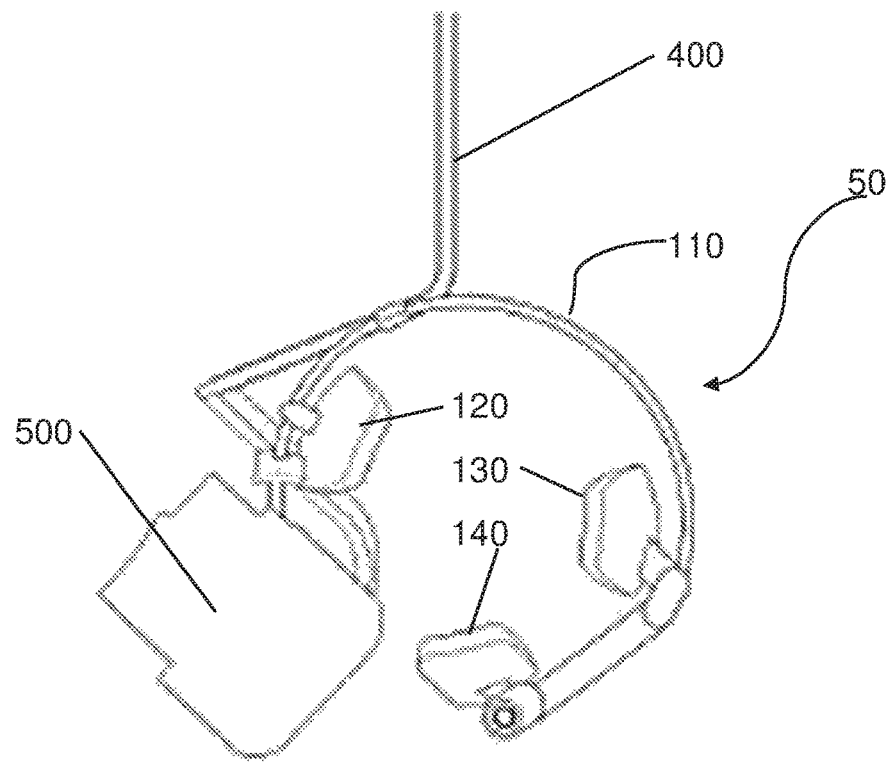
FIG. 2 is a schematic side view of the head mounted display device of FIG. 1 prior to placement on the head of a user.

FIG. 2 is a side view of the head mounted display device 50. FIGS. 3 and 4 are schematic diagrams showing the head mounted display device 50 on the head 600 of a user where FIG. 3 shows the head mounted display device 50 with the display 500 in a raised position and FIG. 4 shows the head mounted display device 50 with the display 500 in a lowered position.

Figure 6:
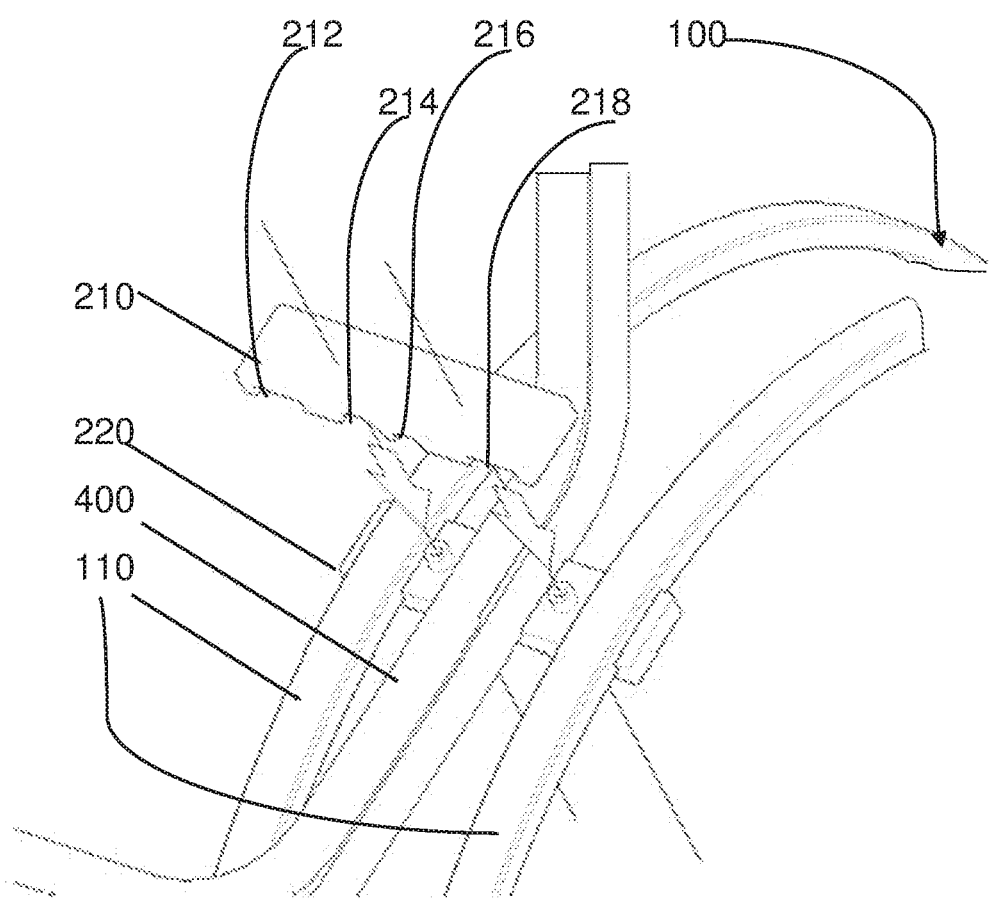
FIG. 6 is an enlarge partial schematic diagram illustrating mounting of the wire harness clip of the head mounted display of the head mounted display of FIG. 1.

FIG. 5 is an expanded view showing the assembly of the display device 500 being attached to the connection buckle 300 using the Spring bolt 310. FIG. 6 is an expanded view showing the upper wire harness clip 210 and a lower wire harness clip 220 separated to receive the wire harness.

With further reference to the figures the structural composition of the present embodiment is further described in detail below.

As shown in FIG. 1, the present embodiment is mainly composed of a supporting assembly 100, a wire harness clip 200, a head mounted display connection buckle 300 and a data cable 400.

As shown in FIGS. 1 and 5, the VR head mounted display 500, the wire harness clip 200, the head mounted display connection buckle 300 and the data cable 400 are connected together through the supporting assembly 100. The supporting assembly 100 comprises a first supporting curved surface 120, a supporting curved surface 130 and a supporting curved surface 140 which are connected in series by the supporting frame 110; a head mounted display connection buckle 300 is mounted on one end of the supporting frame 110 which is engaged with a head mounted display connection point 510 on the VR head mounted display 500. The data cable 400 exits from one side of the VR head mounted display 500, and is further fixed to the supporting frame 110 by the wire harness clip 200 and the extended part thereof is connected to a host within the VR integrated game machine.

The mechanism for operating the head mounted display device according to the present embodiment is described below with reference to FIGS. 1, 5 and 6.

The first supporting curved surface 120, the second supporting curved surface 130 and the third supporting curved surface 140 of the supporting assembly 100 can be dynamically adjusted to perfectly fit the human forehead bone, parietal bone and occipital bone, respectively, thereby providing multiple points of support.

The head mounted display connection buckle 300 disposed at one end of the supporting assembly 100 is engaged with the head mounted display connection point 510 on the VR head mounted display 500 through a spring bolt 310 provided inside the buckle 300. In addition, through the spring bolt 310, the connection buckle 300 can provide two positions for turning the display 500 up and down.

The data cable 400 provides high-definition video transmission and power support for the VR head mounted display 500 and plays a role in suspending and pulling the VR head mounted display 500.

The wire harness clip 200 is composed of an upper part of the wire harness clip 210 and a lower part of the wire harness clip 220. The upper and lower parts of the wire harness clip 210, 220 each have grooves 212, 214, 216, 218 provided therein to accommodate the supporting frame 110 and the data cable 400. The supporting frame 110 and the data cable 400 are firmly fixed together in the grooves 212, 214, 216, 218 by the wire harness clip 200. The position of the wire harness clip 200 is set at a center of the head mounted display device 500. As a result, when the head mounted display device 500 is suspended it is in a central straight position, which makes the overall layout of the device more attractive.

The manner in which the present utility model may be worn are further described in detail with reference to FIGS. 2, 3 and 4.

FIG. 2 shows that the head mounted display device 50 of the present embodiment in a natural suspending state. This is controlled by the wire harness clip 200. The head mounted display device 50 is located at the center of the VR unit which is convenient for users to remove the display unit.

FIG. 3 shows the head mounted display device 50 of the present embodiment being worn by a user. In this case, the VR head mounted display 500 is turned up (raised); accordingly, the eyes of the user are not covered by the VR head mounted display 500, so the user still has unobstructed normal vision.

FIG. 4 shows that the head mounted display device 50 of the present embodiment being worn by a user. In this case, the VR head mounted display 500 is turned downward; accordingly, the eyes of the user are completely covered by the head mounted display 500, and thus the user has entered the world of virtual reality.

After the game is over, the user may take off the head mounted display device 50 and the device returns to its original natural suspending state and the head mounted display device 50 is automatically fully retracted inside the VR self-service game machine.

The purpose of the present embodiment is to provide a correct and comfortable wearing method for a head mounted display device for a VR self-service game machine, and off-line unattended operation thereof. Through the structure provided by the present embodiment the display effect of VR games is maximized. The aim of the present embodiment is to achieve easy wearing, easy installation, easy upgrade, easy maintenance, and easy display.

The present embodiment adopts an overall modular docking design, which provides sharing and unattended operation of game machines. In addition, it can dock with various types of VR head mounted displays of different brands, which is convenient for maintenance and upgrade. The utility model is a key improvement for the manner in which a VR head mounted display of an existing game machine is worn. It is convenient to wear and can meet the requirements of different users who may have various head shapes. Moreover, the present embodiments can improve the wearing experience of the head mounted display device for a VR self-service game machine, make the actual user experience better, reduce operating costs, and improve the user experience of VR gaming devices in an offline operating environment.

A person skilled in the art can make various modifications and changes to the present embodiment. Accordingly, the present invention covers various modifications and changes that fall within the scope of the appended claims and their equivalents.

The invention claimed is:

1. A head mounted VR viewing device for a VR self-service game machine, comprising a supporting frame with a VR display and display connection buckle, multiple curved supporting surfaces, a wire harness and wire harness clip, and a data cable mounted on the supporting frame, such that the VR display, the wire harness clip, the display connection buckle, and the data cable are operatively connected together utilizing the supporting assembly wherein
   a. the supporting frame comprises two parallel curved steel bars,
   b. the wire harness clip is fixed onto the two parallel curved steel bars of the supporting frame,
   c. the supporting curved surfaces comprise two or more curved, cushioned surfaces fixed on the supporting frame, each supporting curved, cushioned surface attached to an inner side of the supporting frame and adapted for contact with a user's head;
   d. the connection buckle mounted on a forward end of the supporting frame including a spring bolt positioned within the connection buckle and configured for moveably retaining the VR display, the spring bolt comprising a compressible spring on a shaft functioning to provide positioning of the display in an upward or downward position.

2. The head mounted VR viewing device of claim 1 wherein the wire harness clip comprises an upper wire harness clip and a lower wire harness clip, the upper wire harness clip and the lower wire harness clip are each provided with grooves therein for receiving the data cable such that when the wire harness clip is assembled and closed the data cable is firmly attached to supporting frame by the wire harness clip.

3. The head mounted VR viewing device of claim 1 wherein the data cable is fixed to the supporting frame via the wire harness clip and an extended portion thereof is connected to a host inside the VR self-service gaming machine.

4. The head mounted VR viewing device of claim 1 wherein the data cable is configured to provide high-definition video transmission and power support for the VR display and functions to suspend the head mounted VR viewing device.

* * * * *